(12) United States Patent
Witherspoon

(10) Patent No.: US 9,926,492 B2
(45) Date of Patent: Mar. 27, 2018

(54) METHOD AND APPARATUS FOR LIQUEFACTION AND DISTILLATION OF VOLATILE MATTER WITHIN SOLID CARBONACEOUS MATERIAL

(75) Inventor: Joseph A. Witherspoon, Kaysville, UT (US)

(73) Assignee: Frontier Applied Sciences, Inc., Scottsdale, AZ (US)

( * ) Notice: Subject to any disclaimer, the term of this patent is extended or adjusted under 35 U.S.C. 154(b) by 965 days.

(21) Appl. No.: 13/637,733

(22) PCT Filed: Apr. 8, 2011

(86) PCT No.: PCT/US2011/031849
§ 371 (c)(1),
(2), (4) Date: Sep. 27, 2012

(87) PCT Pub. No.: WO2011/130130
PCT Pub. Date: Oct. 20, 2011

(65) Prior Publication Data
US 2013/0020189 A1    Jan. 24, 2013

Related U.S. Application Data

(60) Provisional application No. 61/324,151, filed on Apr. 14, 2010.

(51) Int. Cl.
C10G 1/02    (2006.01)
C10B 57/02   (2006.01)
(Continued)

(52) U.S. Cl.
CPC .............. *C10B 49/04* (2013.01); *C10G 1/02* (2013.01); *C10B 49/00* (2013.01); *C10B 49/02* (2013.01);
(Continued)

(58) Field of Classification Search
CPC ......... C10B 47/32; C10B 47/34; C10B 47/36; C10B 49/02; C10B 49/04; C10B 53/06;
(Continued)

(56) References Cited

U.S. PATENT DOCUMENTS 1,146,776 A * 7/1915 Wallmann H F ........ C10G 1/02
  201/16
1,838,622 A * 12/1931 Herrick ..................... C10B 1/04
  110/342
(Continued)

FOREIGN PATENT DOCUMENTS

| | | |
|---|---|---|
| AT | 13688 E | 7/1983 |
| CN | 101230280 B | 6/2011 |
| JP | 2009-166040 A | 7/2009 |

OTHER PUBLICATIONS

Headwaters, Headwaters DCL Technology, date unknown.

*Primary Examiner* — Jonathan Miller
*Assistant Examiner* — Jonathan Luke Pilcher
(74) *Attorney, Agent, or Firm* — ColterJennings

(57) ABSTRACT

A method for liquefaction of coal or other solid carbonaceous material includes passing the material through a reformer having a temperature gradient therein, the temperature gradient generally increasing as the material flows down through the reformer. The more valuable volatile components of the material exit the material at their respective vaporization temperatures, and pass out of the reformer for processing in condensers. Some of each fraction of the volatile material flow is re-heated and recycled through the reformer to supply heat to maintain the temperature gradient, the recycling injection occurring at a level below that where the fraction exited the reformer so that the recycled fraction will again pass out of the reformer to be condensed. At the (Continued)

bottom of the reformer, the non-volatile portion of the carbonaceous material is removed from the reformer for further processing or sale.

18 Claims, 2 Drawing Sheets

(51) Int. Cl.
*C10B 49/00* (2006.01)
*C10B 49/02* (2006.01)
*C10B 49/04* (2006.01)

(52) U.S. Cl.
CPC ...... *C10B 57/02* (2013.01); *C10G 2300/1003* (2013.01); *C10G 2300/4081* (2013.01); *C10G 2300/807* (2013.01)

(58) Field of Classification Search
CPC ......... C10B 57/18; C10B 49/06; C10B 49/08; C10B 1/04; C10B 49/00; C10B 7/08; C10B 7/10; C10B 3/00; C10B 3/02; C10B 47/00; C10B 47/04; C10B 47/06; C10B 47/18; C10B 47/20; C10B 47/42; C10B 57/02; C10B 51/00; C10B 1/02; C10G 1/00; C10G 1/02; C10K 1/04
USPC .............................. 202/91, 93; 21/29; 201/29
See application file for complete search history.

(56) References Cited

U.S. PATENT DOCUMENTS

| | | | |
|---|---|---|---|
| 2,560,767 A * | 7/1951 | Huff | C10G 1/02 201/25 |
| 3,475,319 A * | 10/1969 | MacLaren | C10G 1/02 201/15 |
| 3,503,865 A | 3/1970 | Stone | |
| 3,841,992 A * | 10/1974 | Jones et al. | C10B 53/06 201/29 |
| 4,218,304 A | 8/1980 | Styring et al. | |
| 4,230,557 A * | 10/1980 | Bertelsen | B01D 46/34 201/20 |
| 4,244,180 A | 1/1981 | Rasor | |
| 4,273,643 A | 6/1981 | Bennett | |
| 4,395,309 A | 7/1983 | Esztergar | |
| 4,475,924 A | 10/1984 | Meyer | |
| 4,671,800 A | 6/1987 | Meyer et al. | |
| 4,740,270 A | 4/1988 | Roy | |
| 5,256,278 A | 10/1993 | Rindt et al. | |
| 5,401,364 A * | 3/1995 | Rinker | C10B 49/04 201/1 |
| 6,447,559 B1 | 9/2002 | Hunt | |
| 7,198,655 B2 | 4/2007 | Hogsett et al. | |
| 7,578,928 B2 | 8/2009 | Lott et al. | |
| 7,718,156 B2 | 5/2010 | Zhang et al. | |
| 8,276,289 B2 * | 10/2012 | Causer | C10B 49/02 122/22 |
| 8,322,056 B2 * | 12/2012 | Causer | C10B 49/02 122/22 |
| 8,435,404 B2 * | 5/2013 | Weisselberg | C10G 1/00 202/109 |
| 8,784,649 B2 * | 7/2014 | Weisselberg | C10G 1/00 202/109 |
| 2003/0097784 A1 | 5/2003 | Bennett | |
| 2009/0100701 A1 * | 4/2009 | Ulrich | F26B 25/008 34/242 |
| 2010/0083530 A1 * | 4/2010 | Weisselberg | C10L 9/083 34/505 |
| 2011/0094940 A1 * | 4/2011 | Weisselberg | C10G 1/00 208/390 |
| 2013/0146507 A1 * | 6/2013 | Weisselberg | C10G 1/00 208/407 |

* cited by examiner

METHOD AND APPARATUS FOR LIQUEFACTION AND DISTILLATION OF VOLATILE MATTER WITHIN SOLID CARBONACEOUS MATERIAL

CROSS-REFERENCE TO RELATED APPLICATION

This application claims priority based on U.S. Provisional Patent Application Ser. No. 61/324,151 filed Apr. 14, 2010 and titled "Coal Reformation Process," the disclosure of which is incorporated herein by this reference.

BACKGROUND

This invention relates to an improved continuous-feed process for the liquefaction of coal (anthracite, bituminous, sub-bituminous), gob, bitumen, lignite, oil and tar sands, oil shale, and any solid carbonaceous material, including waste material and plastic material and for the distillation of the volatile matter within that solid carbonaceous material into high-value products.

Until recent decades despite voluminous amounts of CO2 emissions and other contaminants, coal providers have experienced very little ecological pressure from governments. While coal is cheap and produces significant quantities of power, it is also an international "necessity" because the world could not immediately replace this energy source. However, as the world has focused on environmental efficacy, better systems and methods of using the energy stored in coal become more important.

All coal contains varying concentrations of moisture, sulfur, hydrocarbon compounds (referred to as volatile matter), inorganic ash-forming components, and other components. Some of these components have value while other components are considered contaminants. Synthetic production of liquid fuels (i.e., gasoline and oil substitutes) in the United States has a long history. In the 19th century, dozens of facilities produced oil, gas, grease and paraffin from coal, but by 1873, cheap petroleum caused the last coal oil plant to close. In addition, commercial scale shale oil extraction began in 1857 at shale oil retorts retorting the Devonian oil shale along the Ohio River Valley. However, after crude oil discovery in Pennsylvania in 1859, oil shale industries found it difficult to compete and they were shut down by 1861.

Historically, economics has been a major impediment to coal liquefaction. Until recent years oil has been easy to find and produce. In addition, a powerful liquid oil industry has lobbied and maintained a unique control over domestic oil production. The international landscape is now aware of the imminent danger of deep water drilling for oil as evidenced by the British Petroleum oil spill in the Gulf of Mexico in April of 2010.

There are several processes used for coal liquefaction. For example, in the Bergius process, developed by Friedrich Bergius in 1913, dry coal is mixed with heavy oil recycled from the process. A catalyst is typically added to the mixture. The reaction occurs at between 400° C. (752° F.) to 5,000° C. (9,030° F.) and 20 to 70 MPa hydrogen pressure.

Chevron Corporation developed a process that involved close-coupling of the non-catalytic dissolver and the catalytic hydroprocessing unit. The oil produced was lighter and had far fewer heteroatom impurities than other coal oils. Apparently, the process was scaled-up to the 6 ton per day level, but has not been proven commercially.

The Karrick process is a low-temperature carbonization (LTC) and pyrolysis process of carbonaceous materials. Although primarily meant for coal carbonization, it also could be used for processing of oil shale, lignite or other carbonaceous materials. These are heated at 450° C. (800° F.) to 700° C. (1,300° F.) in the absence of air to distill out synthetic fuels-unconventional oil and syngas. The Karrick process may be used for coal liquefaction and for semi-coke production.

In the Karrick process, one short ton of coal yields as much as one barrel of oils and coal tars (12% by weight), 3,000 cubic feet (85 cubic meters) of coal gas and 1,500 pounds (680 kg) of solid smokeless char or semi-coke (for one metric ton, the results would be 0.175 m$^3$ of oils and coal tars, 95 m$^3$ of gas, and 750 kg of semi-coke). Yields by volume of approximately 25% gasoline, 10% kerosene and 20% fuel oil are obtainable from coal. Gasoline obtained from coal by the Karrick process combined with cracking and refining is equal in quality to tetraethyl lead gasolines. More power is developed in internal combustion engines and an increase in fuel economy of approximately 20% is obtainable under identical operating conditions. The syngas can be converted to oil by the Fischer-Tropsch process. Coal gas from Karrick LTC yields greater energy content than natural gas.

Compared to the Bergius process, the Karrick process is cheaper, requires less water and destroys less thermal value (one-half that of the Bergius process). The smokeless semi-coke fuel, when burned in an open grate or in boilers, delivers 20% to 25% more heat than raw coal. The coal gas should deliver more heat than natural gas per heat unit contained due to the greater quantity of combined carbon and lower dilution of the combustion gases with water vapor.

The cheapest liquid fuel from coal will come when processed by LTC for both liquid fuels and electric power. As a tertiary product of the coal distilling process, electrical energy can be generated at a minimum equipment cost. A Karrick LTC plant with one kiloton of daily coal capacity produces sufficient steam to generate 100,000 kilowatt hours of electrical power at no extra cost excepting capital investment for electrical equipment and loss of steam temperature passing through turbines. The process steam cost could be low since this steam could be derived from off-peak boiler capacity or from turbines in central electric stations. Fuel for steam and superheating would subsequently be reduced in cost.

Although a Karrick pilot plant was successfully operated in 1935, there is some question as to whether a modern commercial Karrick LTC process plant would fail due to mechanical problems, a postulation based on previous failures of other plants using different processes under different conditions. It is indeterminate as to how "scaleable" the technology is for large-scale production. When oil was significantly cheaper markets for the described coal products were limited, which made such a venture economically unsound.

Other methods of coal liquefaction involve indirect conversion. Perhaps the main indirect process is the Fischer-Tropsch process, in which coal is first gasified to make syngas (a balanced purified mixture of CO and H2 gas). Next, Fischer-Tropsch catalysts are used to convert the syngas into light hydrocarbons (like ethane) that are further processed into gasoline and diesel. This method was used on a large technical scale in Germany between 1934 and 1945 and is currently being used by Sasol in South Africa. In addition to creating gasoline, syngas can be converted into methanol, which can be used as a fuel or a fuel additive. Syngas may be converted to liquids through conversion of the syngas to methanol, which is subsequently polymerized into alkanes over a zeolite catalyst.

Unfortunately, each of the prior methods of coal liquefaction have disadvantages. The prior processes tend to focus on turning coal to liquid, with little regard for environmental implications. For example, Fischer-Tropsch produces toxic byproducts and consumes expensive catalysts during the process (cobalt, iron, ruthenium). The prior processes have often not been scalable, and thus were of limited viability. Many also had significant capital costs that tended to render the liquefaction economically suspect.

SUMMARY

This invention involves a coal treatment process that permits removal of moisture, sulfur, hydrocarbon compounds (referred to as volatile matter), and other components in a continuous-feed process by applying heat and steam, with hydrogen re-circulation, in an oxygen deficient atmosphere. The result is separation of the volatile matter into valuable gas and liquid fractions for use or further processing in addition to a highly upgraded coal product.

In the process, bulk coal or other carbonaceous material is fed into a reformer that has been evacuated of oxygen. The reformer is typically a large metal container mounted generally vertically. In some embodiments, a rotatable shaft extends down into the container and holds agitation plates. A motor attached to the shaft turns the plates to assist in moving the coal through the container.

One or more vapor draws are mounted at various vertical locations on the shell wall of the reformer container. The vapor draws extract fractions (based on the location of the draws, which in turn is based on a temperature gradient formed inside the container) of the volatile constituents from the heated coal, taking some off for sale or further processing and, depending on the design, recycling portions back into the container. The recycling may include steps such as condensing the gases to extract valuable product, and then heating the gases so as to provide heat to the reformer container. Internal housings on the vapor draws assist in reducing the level of particulates removed from the container by the vapor draws.

One or more injectors are mounted at various vertical elevations on the shell wall of the reformer container for injecting steam or heated re-circulated effluent into the container. The gases are typically injected into the container using the injector at an elevation below the location of the vapor draw from which the gas was removed. As a result, the injected gases provide heating to the container, but generally are removed through the upper vapor draw, so as to keep the factions generally separated. Thus, in more complicated embodiments there are a series of removals of gases, separation, heating of a portion of the removed gases, and recycling the heated portion back into the reformer container to maintain the temperature gradient.

Injecting the heated gases into the container at the various elevations of the injectors creates a temperature gradient inside the container. In general, the higher temperatures are near the bottom of the container, and the gradient cools moving up the container. Because of the temperature gradient, more volatile constituents of the coal exit the reformer container through the upper vapor draws and progressively less volatile constituents exit at vapor draws located closer to the lower end of the reformer container.

Heat is applied to the coal to drive off moisture and vaporize the hydrocarbon compounds and harmful contaminants such as sulfur, mercury and arsenic, thereby removing them from the coal. The steam helps to sweep, or strip, the gaseous components away from the coal and into a series of recovery devices, where these compounds can be condensed, separated, treated and stored. Steam will also react with residual carbon monoxide to form hydrogen and carbon dioxide through the water-gas shift reaction.

The applied heat converts, due to thermal cracking, some of the heavy coal tar components into lighter, more valuable fuel components such as hydrogen, methane, ethane, propane, butane, gasoline boiling range components, and diesel boiling range components. The vaporized heavier hydrocarbon compounds may be condensed and separated into different fuel streams such as gasoline, kerosene, and diesel, or sold without separation as a supplemental crude oil for further processing at a petroleum refinery. Alternatively, the heavy hydrocarbon stream, including the coal tar, may be further processed through a "hydrocracking" process that uses hydrogen and a nickel-molybdenum catalyst to further break down heavy low-value hydrocarbons into lighter high-value hydrocarbons. The hydrocracking process also provides desulphurization of the feed stream, as well as de-nitrogenation through hydrogenation.

The lighter hydrocarbon components may be captured, compressed and condensed to form light gasoline, butane, and propane. The remaining gases after compression typically contain hydrogen and methane. This gas can be used as a fuel-gas stream for the process or the hydrogen may be separated out to form a hydrogen-rich stream to be used for other hydrogen consuming processes.

The reformed coal is removed from the container through an exit near the base of the container and cooled to a temperature low enough to permit contact of the reformed coal with the air. The reformed coal is typically moisture-free. The reformed coal has a higher energy value, perhaps as much as 50% more BTUs per pound over the parent coal, due to the removal of moisture.

Because the reformed coal has a higher BTU content, less reformed coal is required as fuel for the same energy output. This lower fuel requirement may lead to a 30% reduction in $CO_2$ emissions, by mass. The sulfur content of the reformed coal may be less than 1% of that of the parent coal, and thus produces significantly less $SO_x$ emissions when burned. The ash produced from burning the reformed coal is largely free of mercury, and has a much lower concentration of other contaminants relative to ash produced from burning the parent coal.

BRIEF DESCRIPTION OF THE DRAWINGS

Other features and advantages of the present invention will be apparent from reference to the following Detailed Description taken in conjunction with the accompanying Drawings, in which.

DETAILED DESCRIPTION

Figure 1:
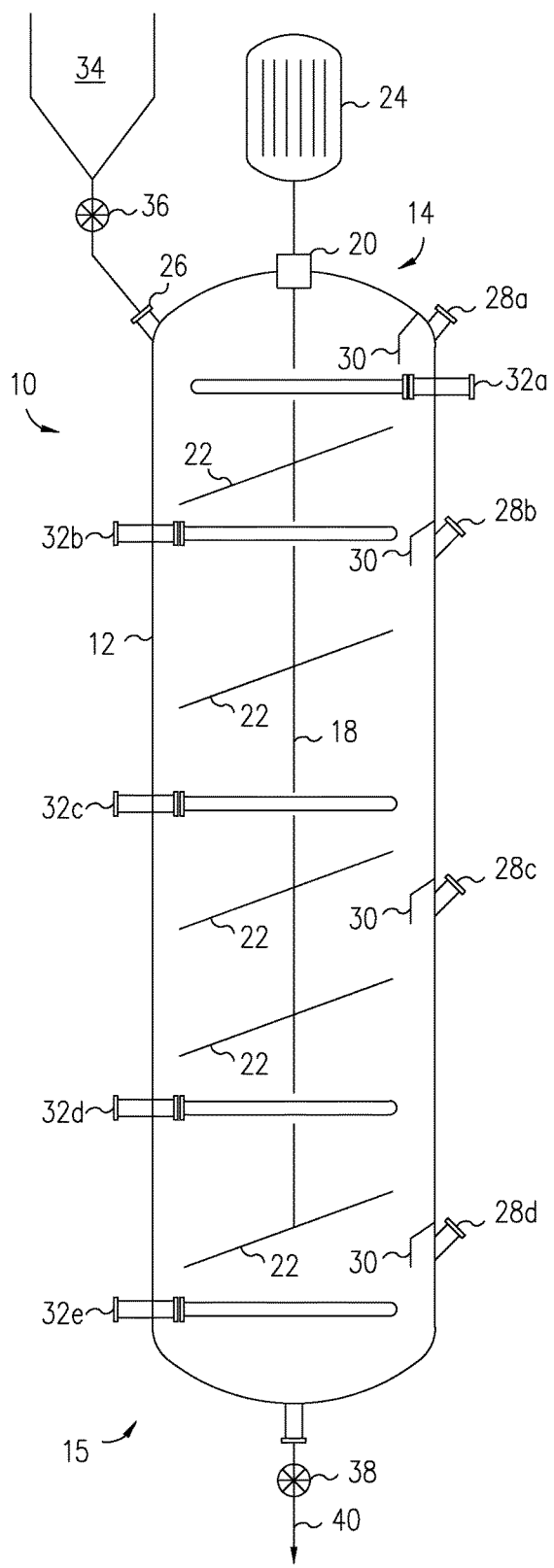
FIG. 1 depicts a schematic diagram of a coal reformer according to one embodiment of the present invention.

As depicted in FIG. 1, according to one embodiment the present method and apparatus involve a solid-vapor reactive fractionator, or coal reformer 10. The reformer 10 has an outer shell wall 12, typically made of steel, and may contain an internal erosion-resistant and corrosion-resistant coating as well as external insulation of known types. The reformer is placed in a generally vertical orientation and thus has an upper end 14 and a lower end 15. A rotatable vertical shaft 18 passes through a seal bearing 20 in the upper end 14 of the reformer. One or more agitation plates 22 are connected to the vertical shaft at various vertical positions. As depicted in FIG. 1, typically the agitation plates 22 are connected at an angle from the horizontal and the vertical. A motor 24 attached to the shaft 18 above the reformer rotates the shaft 18 and thus the agitation plates 22.

A plurality of vapor draws 28 are mounted to the reformer 10 at various locations along the length of the outer shell wall 12. The vapor draws 28 remove vapor from the reformer 10. Each vapor draw has an internal vapor-draw housing 30 designed to try to reduce the amount of coal and other particulates flowing into the vapor draws and potentially plugging up the vapor draw nozzle or other parts of the apparatus. An external coal separation device such as a cyclonic separator or bag filter may also be used to capture and separate fine coal particles from entering other parts of the downstream process equipment (such as the condensers and economizers discussed below).

Each vapor draw 28 is placed at a location selected so as to extract different fractions of volatile constituents of the coal. That is, as the "stack" inside the reformer heats, a temperature gradient forms within the reformer, and the lower locations will be hotter than the upper locations. Thus, the vapor draws 28 located higher on the outer shell wall 12 will remove lighter weight hydrocarbons, and those at lower locations will remove heavier hydrocarbons.

A plurality of injectors 32 are placed at various vertical elevations along the length of the outer shell wall 12. The injectors inject heated fluids into the reformer 10. Often the heated fluids are recycled from the vapor draws 28. That is, as discussed in more detail below, a portion of the hot gases removed by the vapor draws 28 are recycled back into the reformer 10 using the injectors 32.

Raw coal or other carbonaceous material is conveyed from a feed hopper 34 and introduced into the reformer 10. A rotary valve 36 controls the feed rate to the reformer 10 and prevents back flow from the reformer 10 to the hopper 34. Typically, the process starts by filling the reformer 10 with coal, and then purging air from the interior of the reformer using steam. As the coal is processed and the various fractions extracted from the reformer, additional coal passes through the rotary valve 36 and into the reformer 10.

As the coal enters the reformer 10, it starts to heat up and continues heating up as it travels down the reformer 10 to the point (typically fairly high in the reformer) that moisture and some light volatile organic compounds are stripped from the coal. The moisture, light volatile organic compounds, and other gases (from the re-injection streams, as discussed below) exit the reformer 10 through an upper-most vapor draw 28a. As can be seen by referring to FIG. 2, in one embodiment these vapors are routed to an overhead condenser 42 where the vapors are condensed to liquids such as water, butane, pentanes, and light gasoline components.

The liquid and residual gas exit the overhead condenser 42 and separate in an overhead liquid separator 44, which is a three-phase separator that separates the gas from the liquid and separates the hydrocarbon liquid from the aqueous solution. The residual gas from the overhead liquid separator 44 is routed to the suction of a fuel gas compressor 46 and cooled in the fuel gas compressor condenser 48 where fractions such as propane and butane will liquefy and drop out into a compressor discharge three-phase separator 50. The hydrocarbon liquids from the compressor discharge three-phase separator 50 may then be collected for treating, fractionation, storage, or sales.

The residual gas from the compressor discharge three-phase separator 50 is treated to removed contaminants such as free oxygen and nitrogen (air), carbon dioxide, hydrogen sulfide, and others. After treating, the resulting gas stream (see FIG. 2, stream 52) may be sent to a hydrogen purification unit (through a stream 53 shown in FIG. 2) to separate hydrogen from the fuel gas, if desired. The purified hydrogen stream or a slip-stream of the hydrogen-rich fuel gas stream (see FIG. 2, stream 54) may be heated to 200-260° C. (400-500° F.) in a heater 58 and re-injected back into the reformer 10 through an injector 32b above the heavy naphtha vapor draw 28b as a heating and stripping medium.

The liquid from the overhead separator 44 is pumped by a pump 60 and split into two streams. One stream (see FIG. 2, stream 62) combines with a heavy naphtha stream (see FIG. 2, stream 64) from the reformer 10. A second stream (see FIG. 2, stream 68) is used as a quench stream that is re-injected back into the reformer 10 through injector 32a to assist in overhead temperature control.

Water from the overhead separator 44 may contain ammonia, hydrogen sulfide, and other water-soluble components. This water is contaminated, or sour. Thus, the sour water stream (see FIG. 2, stream 70a) is combined with other sour water streams 70, such as that shown at FIG. 2, streams 70b, 70c, 70d and 70e, and sent to treatment.

The coal continues to heat up as it travels down the reformer 10. The heating is caused by heated re-injection streams being introduced into the reformer by the various injectors 32 located further down the reformer 10. As the coal heats from 90-205° C. (200-400° F.), any remaining moisture is removed and any hydrocarbon components that boil in the heavy naphtha range also vaporize out of the coal. These components exit the reformer 10 through the heavy naphtha vapor draw 28b at about 205° C. (400° F.).

The heavy naphtha vapor is condensed in a naphtha condenser 72. The naphtha liquid and residual gas disengage in a naphtha three-phase separator 74. The gas from the naphtha three-phase separator 74 is combined with other residual gas streams and is routed to a vapor recovery unit. From there, the gas may be recovered for treating, fractionation, storage, consumption as fuel, or sales.

Figure 2:
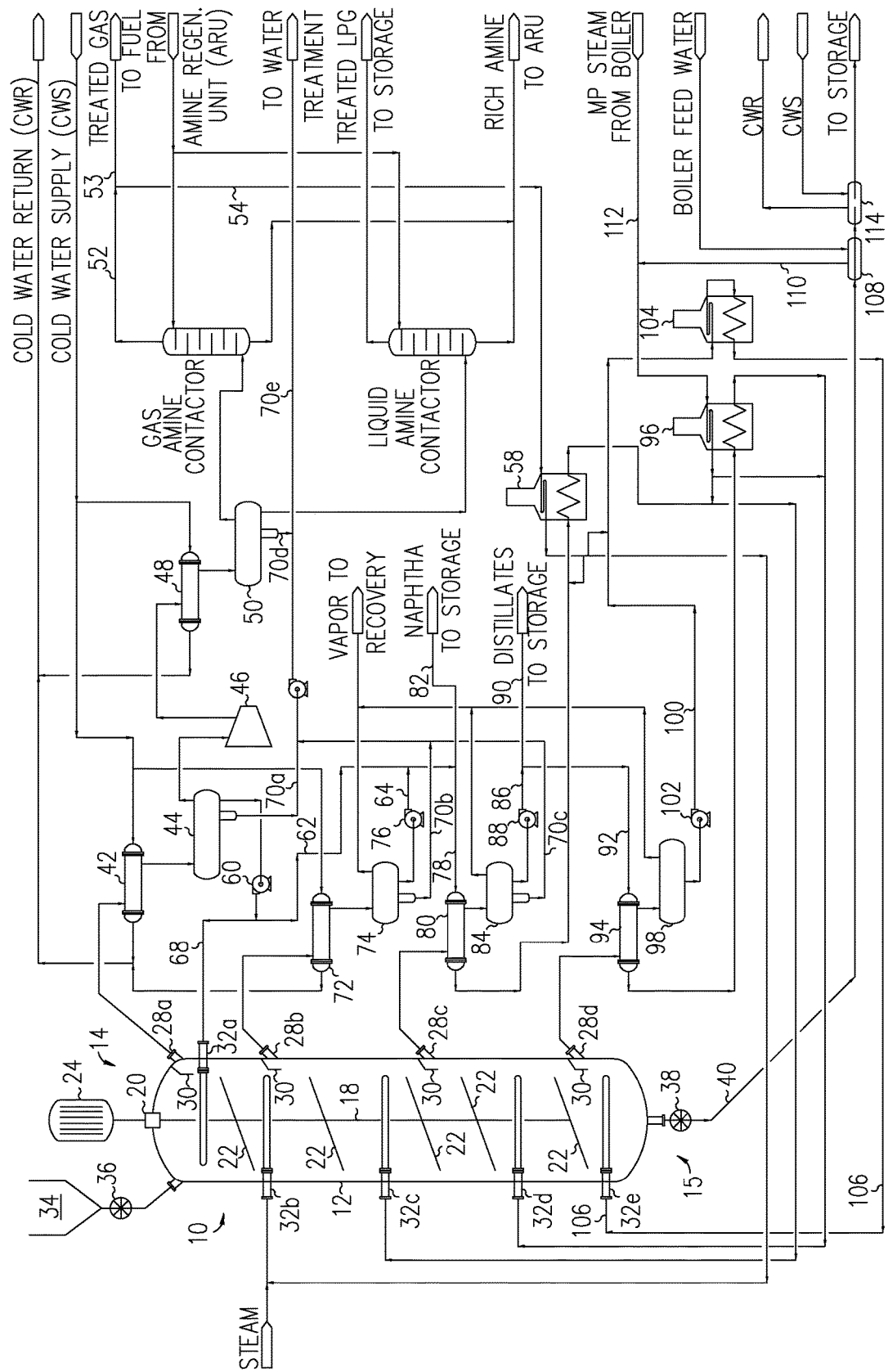
FIG. 2 depicts a process flow diagram of one embodiment of the process of the present invention.

The naphtha from the naphtha three-phase separator 74 is pumped by a pump 76 and split into two streams. As depicted in FIG. 2, one stream 78 may be used as a cooling medium in an economizer 80, where that stream is pre-heated and then routed to the radiant section coils of a fired heater 58, heated to 315-370° C. (600-700° F.) and re-injected into the reformer 10 through the injector 32c above the distillate vapor draw 28c. The other stream 82 is sent to storage and can be further treated, upgraded, and blended into finished gasoline.

As the coal continues down the "stack" in the reformer 10 and heats up from 205° C. (400° F.) to 370° C. (700° F.), hydrocarbon components that boil in this temperature range (distillates) vaporize out of the coal. These distillate vapors exit the reformer 10 through the distillate vapor draw 28c at about 340-370° C. (650-700° F.). The distillate vapors are condensed in the economizer 80 and disengage from the residual gas in a distillate three-phase separator 84.

The distillate is pumped out of the distillate three-phase separator 84 by a pump 88 and split into two streams. The first stream (see FIG. 2, stream 86) goes to storage and can be further processed through an ultra-low sulfur diesel hydrotreater or sold as unfinished diesel. The second stream (FIG. 2, stream 92) is pre-heated in an economizer 94 and heated up to about 480° C. (900° F.) through the radiant coils of a fired heater 96. This second stream is then re-injected into the reformer 10 by the injector 32d above the heavy coal tar vapor draw 28d.

The heavy coal tar vapors exit the reformer 10 through a vapor draw 28d and are condensed through the economizer 94. The heavy coal tar disengages from the residual gas in a coal-tar separator 98. The liquid coal tar 100 is pumped out of the coal-tar separator 98 via a pump 102 and receives an injection of the hot hydrogen-rich fuel gas stream (see FIG. 2, stream 54), heated up to 425-480° C. (800-900° F.) from the convection coils of a fired heater 58.

The hydrogen enriched coal tar stream is heated up to 650-705° C. (1200-1300° F.) by a fired heater 104. The coal tar will decompose at these temperatures (thermally crack) into smaller molecules, typically diesel and gasoline components as well as butanes, propane, ethane, methane and more hydrogen. Also, the high temperature and presence of hydrogen, and the metals that are present in the coal, induce both hydrocracking and hydrotreating reactions that further break down the large and heavy hydrocarbon molecules into smaller and more valuable hydrocarbon components such as diesel, gasoline, butanes, propane, ethane, and methane by the reaction of the large hydrocarbon molecules with hydrogen (hydrocracking). These same reactions often remove the sulfur, nitrogen, and oxygen components of the coal by the reaction of these components with hydrogen (hydrotreating).

The output stream 106 of the fired heater 104 is re-injected into the reformer 10 through the injector 32e near the bottom 15 of the reformer 10. This heats the coal to its final temperature of about 1000° F., drives out the remaining volatile matter from the coal, and recovers the cracked stock created from thermal cracking the coal tar in the fired heater 104. The hydrocracking and hydrotreating reactions that occur in the reformer 10 utilize the coal and its associated metals as catalysts to further break down the large carbon chains of the coal as well as further remove sulfur, nitrogen, and oxygen from the molecules of the coal. The coal tar stream may be recycled to extinction.

The hot reformed coal product exits the bottom of the reformer 10 through a rotary valve 38. A section of the transfer pipe 40 containing the hot reformed coal may be jacketed. Boiler feed water (hot water at about 100° C., ready to boil) flowing through the jacketed pipe 108 may be used to cool the reformed coal to about 120-105° C. (250-225° F.). Typically, as depicted in FIG. 2, stream 110, the boiler feed water is heated up to medium pressure steam 110 and combined with other medium pressure steam 112 to use as a stripping steam to the system as well as other uses throughout the process.

Steam may also be super-heated up to 425-480° C. (800-900° F.) through the convection coils of the fired heater 96. The warm reformed coal can be further cooled by flowing cooling water or other cooling medium through an additional section of jacketed transfer pipe 114 to cool the reformed coal down to a safe temperature (typically below 50° C. or 120° F.). A series of jacketed auger-type solids pumps may be used in lieu of the rotary valve 38 and jacketed pipes 108 and 114 to transfer and cool the reformed coal product.

Once the reformed coal is sufficiently cooled, it is safe to contact the reformed coal with dry air. Dry air may be used at this point to convey the reformed coal to the reformed coal storage silos. The reformed coal may then be used as a fuel or other desired uses.

The coal reformer 10 and the agitation plates 22 may be made of different materials, but typically would be steel or stainless steel with an internal erosion-resistant and corrosion-resistant coating or liner, appropriate insulation, and sized according to the desired continuous throughput, which is also based on the specific material being processed. The other various components of the process equipment are those known in the art. For example, the condensers may be a standard shell-and-tube type heat exchanger and the heaters may be standard fire heaters or furnaces as known in the art. Similarly, standard piping and valves may be used. Again, each of these items is sized to handle the throughput of the reformer 10.

Although the embodiments discussed in this disclosure involve the processing and treatment of coal, the method and apparatus described is suitable for the extraction and fractionation of other solid carbonaceous materials, such as coal (anthracite, bituminous, sub-bituminous), gob, bitumen, lignite, oil and tar sands, oil shale, and solid carbonaceous material including waste material and plastic material. Thus, these solid carbonaceous materials may be processed to distill the volatile matter within that solid carbonaceous material into high-value products. Thus, the present invention has several advantages over the prior art. Although embodiments of the present invention have been described, various modifications and changes may be made by those skilled in the art without departing from the spirit and scope of the invention.

The invention claimed is:

1. A method for treating solid carbonaceous material comprising the steps of:
    feeding bulk solid carbonaceous material from a feed hopper through an input valve and into a reformer to fill a predetermined proportion of the reformer, and evacuating air from inside the reformer to maintain a substantially oxygen-deficient atmosphere inside the reformer, the reformer having a predetermined length, an upper end and a lower end, and a generally upright orientation and having:
    an outer shell wall;
    a shaft connected to a drive motor, the shaft passing into the reformer through a seal bearing;
    a plurality of non-horizontal agitation plates connected at predetermined positions along the shaft and configured so that rotation of the shaft rotates the agitation plates and produces a bed of carbonaceous material, thereby increasing fractionation quality and yields;
    a plurality of injectors placed at predetermined vertical elevations along the length of the reformer for injecting heated recycled hydrocarbon fluids into the reformer;
    a plurality of vapor draws located at predetermined locations along the length of the reformer for removing fluids from the reformer, each of the vapor draws having an internal vapor-draw housing to reduce the amount of particulates flowing into the vapor draws as other vapors flow into the vapor draws, each vapor draw being situated at a location for extracting at least three predetermined fractions of volatile hydrocarbon constituents of the carbonaceous material based on a predetermined temperature gradient formed within the reformer to vaporize and to fractionate volatile matter from the solid material and induce thermal cracking, hydrocracking, and hydro-treating of the heavier fractions and of the fixed carbon;
    a nozzle for injecting a reflux fluid stream that has been condensed from a predetermined portion of fluid from a first vapor draw back into the reformer to thereby at least partially control temperature within the reformer; and an exit connected to an output valve through which treated carbonaceous material having reduced sulfur and moisture and enhanced heating value exits the reformer;

maintaining the predetermined temperature gradient in the reformer, the temperature gradient resulting in a higher temperature near the lower end of the reformer and a lower temperature near the upper end of the reformer, the temperature gradient thereby causing the most volatile hydrocarbon constituents of the carbonaceous material to exit the reformer through the vapor draw located closest to the upper end of the reformer and progressively less volatile hydrocarbon constituents to exit at vapor draws located progressively closer to the lower end of the reformer;

condensing a first predetermined part of the most volatile hydrocarbon constituents and using the condensate as the reflux fluid stream;

compressing a second predetermined part of the most volatile hydrocarbon constituents, heating the compressed second predetermined part, and recycling the compressed and heated second predetermined part through a first injector that is located at a first predetermined vertical elevation;

recycling a predetermined allotment of a first extract derived from at least one of the first predetermined part of the most volatile hydrocarbon constituents and the second predetermined part of the most volatile hydrocarbon constituents by:

condensing the predetermined allotment of the first extract;

pumping the condensed first extract into a first heat exchanger that is attached to a second vapor draw that is at a second predetermined vertical position;

using the first extract to condense a second extract from the second vapor draw and thereby re-vaporize the first extract; and heating the re-vaporized first extract to a predetermined temperature by means of a first heater that is external to the reformer and recycling the heated first extract back into the reformer through a second injector that is at a third predetermined vertical elevation; and collecting any remaining extracts for use or further processing; and cooling the treated carbonaceous material as it exits through the output valve, with waste heat recovery and re-injection, and collecting the cooled treated carbonaceous material.

2. The method of claim 1 further comprising the step of recycling a predetermined allotment of a third extract from a third vapor draw that is at a fourth predetermined vertical location by:

condensing the predetermined allotment of the third extract;

pumping the condensed third extract into a second heat exchanger that is attached to a fourth vapor draw that is at a fifth predetermined vertical position;

using the third extract to condense a fourth extract from the fourth vapor draw and thereby re-vaporize the third extract; and heating the re-vaporized third extract to a predetermined temperature by means of a second heater that is external to the reformer and recycling the heated third extract back into the reformer through a third injector that is at a sixth predetermined vertical elevation.

3. The method of claim 1 wherein at least one of the injectors is configured to add heat to the reformer at the predetermined vertical elevation of that injector.

4. A method of distilling the volatile hydrocarbon components from a solid carbonaceous material and fractionating those components into separate liquid and solid streams comprising the steps of:

feeding solid carbonaceous material into a reformer to fill a predetermined proportion of the reformer and evacuating air from inside the reformer to maintain a substantially oxygen-free atmosphere inside the reformer, the reformer having a predetermined length, an upper end and a lower end, and a generally upright orientation and having:

a plurality of non-horizontal agitation plates connected at predetermined positions along a shaft mounted in the reformer and configured so that rotation of the shaft rotates the agitation plates and produces a bed of carbonaceous material;

a plurality of injectors at predetermined vertical elevations along the length of the reformer for injecting recycled hydrocarbon fluids into the reformer, which fluids have been heated to a predetermined temperature by means of at least one heater that is external to the reformer, each injector receiving a hydrocarbon fluid of a different composition;

a plurality of vapor draws located at predetermined locations along the length of the reformer for removing fluids from the reformer, each vapor draw being situated at a location for extracting predetermined fractions of volatile hydrocarbon constituents of the carbonaceous material based on a predetermined temperature gradient formed within the reformer;

a nozzle for injecting a reflux fluid stream from the vapor draw back into the reformer; and an exit connected to an output valve through which treated carbonaceous material having reduced sulfur and moisture and enhanced heating value exits the reformer; and maintaining the predetermined temperature gradient in the reformer, the temperature gradient resulting in a higher temperature near the lower end of the reformer and a lower temperature near the upper end of the reformer, the temperature gradient thereby causing more volatile hydrocarbon constituents of the carbonaceous material to exit the reformer through vapor draws closer to the upper end of the reformer and less volatile hydrocarbon constituents to exit at vapor draws located closer to the lower end of the reformer.

5. The method of claim 4 further comprising the step of recycling a predetermined allotment of a first extract derived from the most volatile hydrocarbon constituents from a first vapor draw by:

condensing the first extract;

pumping the first extract into an economizer that is attached to a second vapor draw;

using the first extract to condense a second extract from the second vapor draw and thereby re-vaporize the first extract; and heating the re-vaporized first extract to a predetermined temperature and recycling the heated first extract back into the reformer at a predetermined elevation.

6. The method of claim 4 in which each of the vapor draws has an internal vapor-draw housing to reduce the amount of particulates flowing into the vapor draw.

7. The method of claim 4 in which the reformer further comprises an exit connected to an output valve through which treated solid carbonaceous material exits the reformer.

8. The method of claim 4 further comprising the step of condensing a first predetermined part of the volatile hydrocarbon constituents and using the condensate as the reflux fluid stream.

9. The method of claim 4 further comprising the step of compressing a second predetermined part of the volatile hydrocarbon constituents, heating the compressed second predetermined part, and recycling the compressed and heated second predetermined part back into the reformer.

10. The method of claim 4 further comprising the steps of distillation of at least three volatile hydrocarbon compounds recovered from the solid carbonaceous material, and removal of water from the solid carbonaceous material.

11. The method of claim 4 further comprising the steps of removal of sulfur compounds and nitrogen compounds from the solid carbonaceous material.

12. An apparatus for treating solid carbonaceous material comprising:
a reformer having a predetermined length, an upper end and a lower end, and a generally upright orientation;
a plurality of vapor draws located at predetermined locations along the length of the reformer for removing fluids from the reformer, each vapor draw being situated at a location for extracting predetermined fractions of volatile hydrocarbon constituents of the carbonaceous material based on a predetermined temperature gradient formed within the reformer;
a plurality of injectors placed at a plurality of predetermined vertical elevations along the length of the reformer for injecting heated recycled hydrocarbon fluids collected from a plurality of vapor draws back into the reformer, each injector receiving a hydrocarbon fluid of a different composition;
at least one heater that is external to the reformer and that is connected to at least one of the vapor draws and to at least one of the injectors, the at least one heater configured to receive at least a portion of the collected hydrocarbon fluids from the connected vapor draw, heat the portion of the collected hydrocarbon fluid, and pass the heated hydrocarbon fluid to the connected injector for injection into the reformer at the predetermined vertical elevation for that injector; and
an exit connected to an output valve through which cooled and treated solid carbonaceous material having reduced sulfur and moisture and enhanced heating value exits the reformer.

13. The apparatus of claim 12 further comprising:
a shaft connected to a drive motor, the shaft passing into the reformer through a seal bearing; and
a plurality of non-horizontal agitation plates connected at predetermined positions along the shaft and configured so that rotation of the shaft rotates the agitation plates.

14. The apparatus of claim 12 in which each of the vapor draws has an internal vapor-draw housing to reduce the amount of particulates flowing into the vapor draws as other vapors flow into the vapor draws.

15. The apparatus of claim 12 further comprising a nozzle for injecting a hydrocarbon reflux fluid stream that has been condensed from a predetermined portion of hydrocarbon fluid from a vapor draw back into the reformer to thereby at least partially control the temperature gradient within the reformer.

16. The apparatus of claim 12 further comprising a condenser connected to a first vapor draw for condensing a first predetermined part of the volatile hydrocarbon constituents.

17. The apparatus of claim 12 further comprising a means external to the reformer for re-heating a first predetermined part of the volatile hydrocarbon constituents prior to recycling the first predetermined part back into the reformer to assist in controlling the temperature gradient within the reformer.

18. The apparatus of claim 12 further comprising:
a compressor connected to a vapor stream flowing from a vapor draw, the compressor configured to compress the vapor stream;
means for recycling a first portion of the compressed vapor stream back into the reformer;
means for passing a second portion of the compressed vapor stream into a high heating value fuel gas system for internal process heat; and
means for recycling a third portion of the compressed vapor stream to storage, purification or further processing.

* * * * *